(12) United States Patent
Pradhan et al.

(10) Patent No.: US 7,725,885 B1
(45) Date of Patent: May 25, 2010

(54) METHOD AND APPARATUS FOR TRACE BASED ADAPTIVE RUN TIME COMPILER

(75) Inventors: Salil Pradhan, Santa Clara, CA (US); Lacky Shah, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/567,312

(22) Filed: May 9, 2000
(Under 37 CFR 1.47)

(51) Int. Cl.
*G06F 9/45* (2006.01)

(52) U.S. Cl. ...................................... 717/148

(58) Field of Classification Search ......... 717/114–148, 717/151–161; 711/118, 138; 714/38, 39; 712/236, 245; 707/206
See application file for complete search history.

(56) References Cited

U.S. PATENT DOCUMENTS

| | | | | |
|---|---|---|---|---|
| 5,182,806 A | * | 1/1993 | McKeeman et al. | 717/145 |
| 5,768,592 A | * | 6/1998 | Chang | 438/758 |
| 5,784,553 A | * | 7/1998 | Kolawa et al. | 714/38 |
| 5,815,720 A | * | 9/1998 | Buzbee | 717/158 |
| 5,966,537 A | * | 10/1999 | Ravichandran | 717/158 |
| 6,016,399 A | * | 1/2000 | Chang | 717/160 |
| 6,078,744 A | * | 6/2000 | Wolczko et al. | 717/153 |
| 6,081,665 A | * | 6/2000 | Nilsen et al. | 717/116 |
| 6,112,025 A | * | 8/2000 | Mulchandani et al. | 709/331 |
| 6,253,215 B1 | * | 6/2001 | Agesen et al. | 707/206 |
| 6,311,325 B1 | * | 10/2001 | Levine et al. | 717/128 |
| 6,336,213 B1 | * | 1/2002 | Beadle et al. | 717/136 |
| 6,397,379 B1 | * | 5/2002 | Yates et al. | 717/140 |
| 6,530,075 B1 | * | 3/2003 | Beadle et al. | 717/114 |
| 6,546,550 B1 | * | 4/2003 | Ogata et al. | 717/148 |
| 6,604,210 B1 | * | 8/2003 | Alexander et al. | 714/39 |
| 6,637,025 B1 | * | 10/2003 | Beadle et al. | 717/148 |
| 6,851,109 B1 | * | 2/2005 | Alexander et al. | 717/148 |
| 6,907,437 B1 | * | 6/2005 | Trotter | 707/206 |

\* cited by examiner

*Primary Examiner*—Tuan Anh Vu

(57) ABSTRACT

The present invention relates to a mechanism for adaptive run time compilation of traces of program code to achieve efficiency in compilation and overall execution. The mechanism uses a combination of interpretation and compilation in executing byte code. The mechanism selects code segments for compilation based upon frequency of execution and ease of compilation. The inventive mechanism is able to compile small code segments, which can be a subset of a method or subroutine, and comprising only single path execution. The mechanism thereby achieves efficiency in compilation by having less total code as well as having only straight line, or single path execution, code to compile.

16 Claims, 3 Drawing Sheets

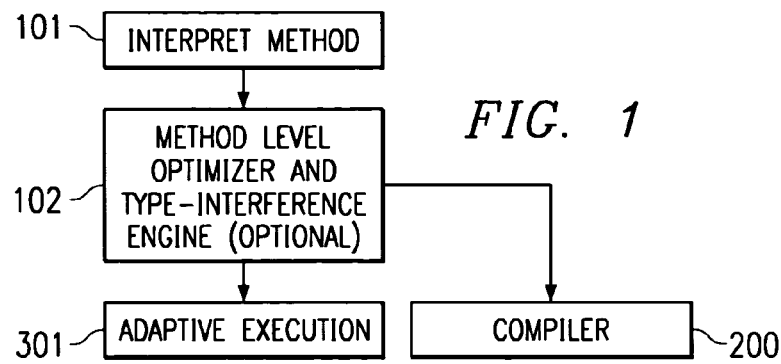
FIG. 1
FIG. 2
201 — REMOVE BYTE CODE TRACE FROM QUEUE
202 — JAVA INTERMEDIATE LANGUAGE
203 — TRANSLATION TO JAVA INTERMEDIATE LANGUAGE (JIL)
204 — JIL OPTIMIZER
205 — REGISTER ALLOCATION
206 — CODE GENERATION
207 — LOW LEVEL OPTIMIZER
208 — BRANCH FINDER
209 — INSTRUCTION PACKER
210 — BACK PATCH CODE AND PLACE IN CODE CACHE
211 — PATCH BYTE CODE
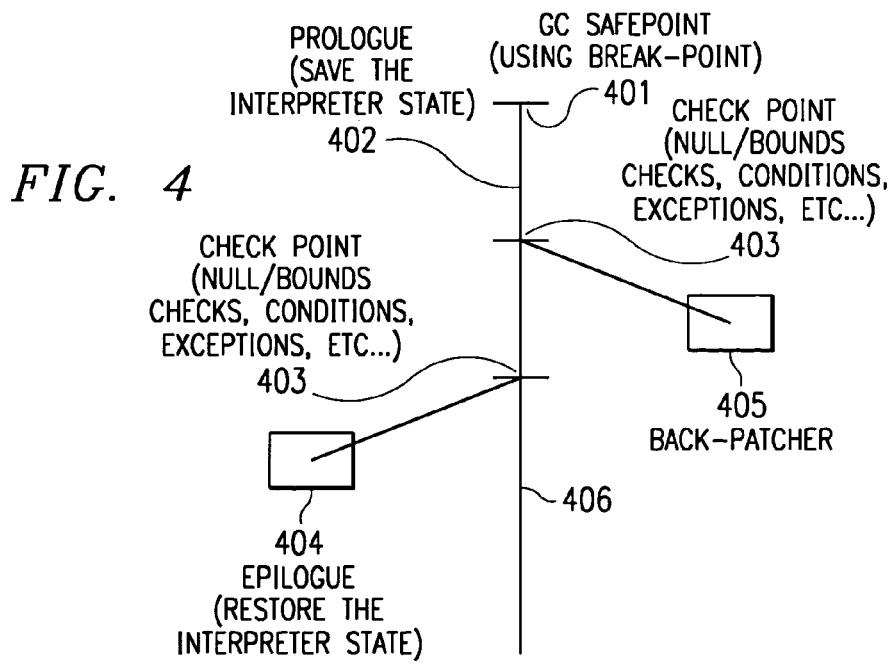
FIG. 4

METHOD AND APPARATUS FOR TRACE BASED ADAPTIVE RUN TIME COMPILER

RELATED APPLICATIONS

The present application is related to concurrently filed, co-pending and commonly assigned U.S. patent application Ser. No. 09/568,192, entitled "METHOD AND APPARATUS FOR INCREMENTAL DYNAMIC OPTIMIZATIONS," the disclosure of which is hereby incorporated herein by reference.

TECHNICAL FIELD

This invention relates to an adaptive run time compiler capable of efficiently selecting code traces for optimization during execution of a program.

BACKGROUND

Run time compiling generally involves the use of a dynamic compiler. Run time compiling with dynamic compilers is commonly used in execution of JAVA code. A variety of dynamic compilers with varying attributes such as Just In Time (JIT) compilers have been employed for this purpose, some being optimizing compilers and some not.

These prior art dynamic compilers generally translate or compile entire methods or subroutines at a time. Therefore, even if only part of the method will actually be executed with substantial frequency, the entire method will still generally be compiled. The compilation of portions of a method or subroutine which will not be frequently executed represents an inefficient commitment of computational effort to the compiling process. This inefficiency remains even if the compiled method is frequently called by the calling routine, and if portions of the method are frequently executed.

Run time compiling may generally be improved through the use of various optimizing techniques. These techniques typically require that the compiler have substantial knowledge of the execution path which will be realized at run time. Prior art dynamic compilers typically do not have complete information on the execution paths likely to occur at run time, and therefore are not able to effectively optimize execution of the source code.

When using JAVA, "type" information describing what type of objects exist within the source code is embedded therein. The availability of this "type" information at run time permits still further optimization of execution at run time.

Therefore, it is a problem in the art that dynamic compilers must translate entire methods at a time even though only certain portions of the method will be frequently executed.

It is a further problem in the art that prior art dynamic compilers do not have complete execution path information, thereby preventing optimization of compilation and execution at run time.

SUMMARY OF THE INVENTION

These and other objects, features and technical advantages are achieved by a system and method which uses an adaptive run time compiler to selectively translate portions of code most frequently executed by an interpreter for compilation thereby achieving high execution speed without performing unnecessary compilation.

In many applications, it has been observed in industry that a disproportionate amount of execution time is spent on certain code sections. To be more specific, as much as ninety percent of execution time can be spent on ten percent of the code. The time consuming code in such a case is known as "90/10 code", or "80/20 code" where, in the latter case, the percent of execution time and amount of code are eighty percent and 20 percent, respectively. It is therefore highly desirable for the dynamic compiler to able to identify which portions of code are worth compiling, and which code should be executed by interpretation. Compiling too much code generally costs time during compilation, whereas compiling too little code generally costs time during execution. The optimum level of compilation may preferably be obtained by accurately locating the frequently executed code.

In a preferred embodiment, during execution, the interpreter portion of the inventive mechanism executes code on an ongoing basis, and is able to determine which portions of the code can be most profitably compiled, i.e. the frequently executed code. Based on the frequency of execution, the interpreter preferably selects portions of the byte code traces for compilation. The compiler converts the selected byte code trace portions into machine code, and performs optimizing operations on the compiled code rendering future execution of the selected code portions extremely fast.

In a preferred embodiment, the mechanism of the present invention is able to select code portions based on their execution paths. The mechanism preferably does not need to compile an entire method or subroutine at a time. This ability permits the inventive mechanism to compile the most execution-time intensive code while avoiding unnecessarily compiling infrequently executed code. It is noted that a single method or subroutine could contain both frequently and infrequently executed code. Therefore, it is generally beneficial to computational efficiency to be able to compile only a portion of a method or subroutine.

In a preferred embodiment, the code selected for compilation in each case is only a portion of a byte code trace and thus contains a single path flow. Compiling code containing only single path flow is faster than compilation of code having multiple paths, thereby minimizing the compile time of the selected code. Therefore, not only is the amount of code to be compiled minimized, but the simplicity, or absence of branching, in the code to be compiled preferably further operates to reduce the compile time.

Therefore, it is an advantage of a preferred embodiment of the present invention that inventive mechanism compiles the most frequently executed code.

It is a further technical advantage of a preferred embodiment of the present invention that compilation is rapid.

It is a further technical advantage of a preferred embodiment of the present invention that the mechanism can compile small portions code, and particularly that code selected for compilation can be a subset of a method or subroutine.

It is a still further technical advantage of a preferred embodiment of the present invention that the code selected for compilation can be efficiently optimized by the compiler.

It is a still further technical advantage of a preferred embodiment of the present invention that there is a reduced need for synchronization.

It is a still further technical advantage of a preferred embodiment of the present invention that garbage collection is reduced.

It is a still further technical advantage of a preferred embodiment of the present invention that profile information is more accurately used than in prior art systems.

It is a still further technical advantage of a preferred embodiment of the present invention that the code to be compiled in a preferred embodiment of the present invention has a single path flow and is therefore straightforward and quick to compile.

It is a still further technical advantage of a preferred embodiment of the present invention that the compiler of the present invention has access to profile information provided by the JAVA language.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which:

FIG. 1 depicts a high level block diagram representation of the run time compiler according to a preferred embodiment of the present invention;

FIG. 2 depicts a sequence of operations of the compiler portion of the adaptive run time compiler according to a preferred embodiment of the present invention;

FIG. 4 depicts allowable exit points from execution of a trace by a compiler according to a preferred embodiment of the present invention.

DETAILED DESCRIPTION

Figure 3:
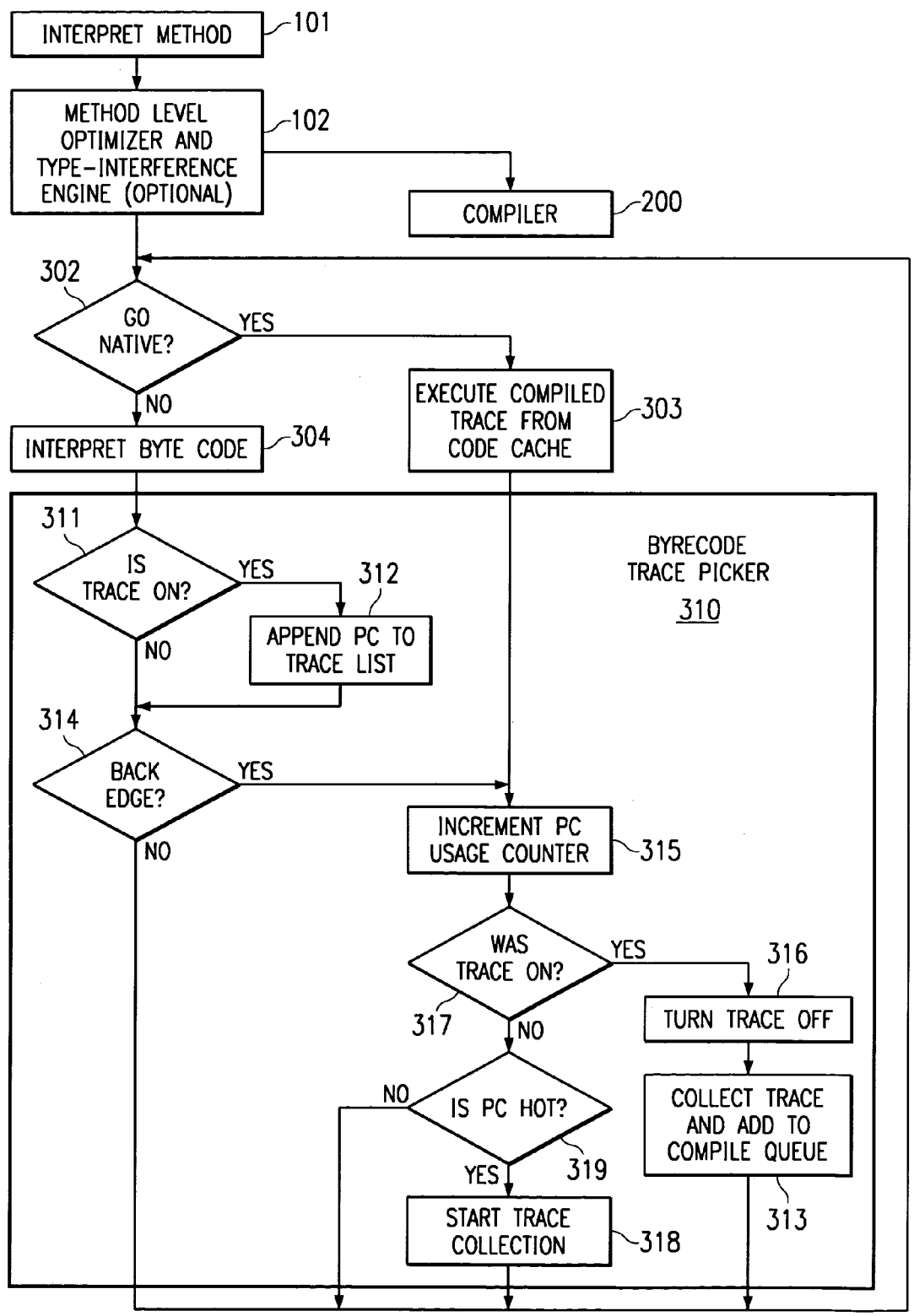
FIG. 3 depicts a flow chart of an adaptive execution scheme according to a preferred embodiment of the present invention.

FIG. 1 depicts a high level block diagram representation of the run time compiler according to a preferred embodiment of the present invention. At step 101, the interpreter acquires a method to process. At step 102, the mechanism may optionally optimize the method as a whole in the compiler 200. It is noted that in the present invention there is no obligation to optimize or compile an entire method at a time. The compiler 200 is discussed in detail in FIG. 2. If the method as a whole is not optimized, the mechanism proceeds with adaptive execution 301, which is discussed in detail in FIG. 3.

FIG. 2 depicts a sequence of operations 200 of the compiler portion of the adaptive run time compiler mechanism according to a preferred embodiment of the present invention. In a preferred embodiment, during run time, the interpreter selects byte code traces for compilation based on a number of factors. These are discussed in greater detail in connection with FIG. 3. Upon selecting a byte code trace for compilation, the byte code trace is then preferably placed in a queue for the compiler, which preferably runs on its own thread, then collects and acts upon.

At step 201, the compiler preferably removes a bytecode trace from the queue of bytecode traces to be compiled. Just-in-Time compilers (JITs) have generally compiled one method at a time. This coarse granularity of compilation generally caused prior art systems to experience long pauses due to the duration of the compilation process. By contrast, the Adaptive Run Time Compiler (ARC) will preferably compile with much finer granularity. Bytecode applications are continually profiled by the Bytecode Trace Picker (BTP). Code sections which are frequently executed, and are straightforward to compile, are considered "hot" since it is highly desirable to compile them. Other factors may make a code section "hot" and therefore suitable for compilation.

In a preferred embodiment, straight-line bytecode traces within hot regions of the executing bytecode application are selected for compilation. Since considerable time is spent optimizing the trace, overall execution is generally benefitted only if the selected trace is executed frequently. When using Java source code, it is particularly important that the BTP be able to pick traces at the Java bytecode level.

In a preferred embodiment, at step 202, the mechanism prepares to convert the selected trace to the Java Intermediate Language (JIL). The Java Intermediate Language is an intermediate representation designed within CLL (California Language Labs) for doing high level optimization on Java bytecode. The JIL preferably exposes redundant sub-operations within the bytecode. Unlike the stack-based bytecode, JIL is preferably based on virtual registers. It was originally designed for a complete method-level (or even inter-method level) optimizer based on Single Static Assignment. Since traces generally consist of straight-line code, and since all class, method, and field resolutions have been performed before picking a trace, only a subset of JIL is needed.

At step 203, the mechanism preferably proceeds to convert the byte code trace into the Java Intermediate Language. Translating bytecode to JIL is similar to translating from a stack-based language to a register based one. Bytecode instructions manipulate local variables, instance variables (variables which are part of objects), and stack slots. Dataflow analysis recovers data for a particular program counter (PC), a particular Stack Pointer (SP), and a particular code type in each slot. A register is associated with each slot and low-level data type. At the conclusion of step 203, the selected code trace has preferably been fully converted to Java Intermediate Language code.

Preferably, at step 204, the JIL optimizer acts upon the JIL code. The JIL optimizer is needed to perform object-oriented and other high-level optimizations on JIL code. It will perform a range of optimizations including but not limited to one or more of the following: value numbering, assertion propagation (existence checks, bounds checks), type propagation, redundant load/store elimination, conditional constant propagation, constant folding, and common sub-expression elimination. The optimizer preferably makes use of the currently inferred types as well as information from the type-feedback mechanism. Other optimizations including, but not limited to loop unrolling, may also be performed, particularly if doing so further exposes redundant assertion checks (such as a null check and a range check). The JIL optimizer is preferably invoked automatically as part of the translation of the byte code traces to JIL. This presents an opportunity to perform parse-time optimizations.

At step 205, the mechanism preferably performs register allocation. In a preferred embodiment, the JIT uses a graph coloring algorithm for register allocation. This preferably results in rapid and efficient register allocation, but also accounts for over 70% of the total compile time. In an alternative embodiment, a simpler algorithm for register allocation could cause more spillage and less optimal allocation, but at the same time dramatically reduce compile time.

In a preferred embodiment, when exiting from a compiled trace to the interpreter, registers holding data values have to be spilled to appropriate locations on the Java stack. The register allocator for ARC needs to allocate registers based on a interval graph.

At step 206, code generation is a matter of traversing the JIL data-structures and calling SLLIC_LITE function representing PA-RISC (precision architecture reduced instruction set computer) instructions.

Generally, traces may span bytecode methods. A trace may start in a first method called Foo, for example, and enter a second method called Bar, for example, and terminate in Bar, the second method. Since the interpreter will preferably resume execution in Bar, the compiled trace preferably includes PA-RISC instructions to set up the Java stack when going from one method to another. Compiled traces will generally not have a PA convention stack. They will instead use the same Java stack as the interpreter.

Herein, "inlining" generally refers to a process in which code from a called method or subroutine is incorporated "in line" with the code of a calling routine or main program. In this situation, the calling routine is the "inliner," and the called routine, the inlinee.

Preferably, when traces are able to go through small methods they may be inlined. In this case, it would be unnecessary to set up a Java stack on entry of a method. This is possible only when there are no catch clauses in the inlinee, as the interpreter will not have to handle any exits from the trace while in the inlined method.

In a preferred embodiment, when compiling a trace, the code generator adds a single prologue per entry, and one epilogue per exit from the trace. The prologue preferably includes a point at which it is safe to conduct garbage collection, such safe point being generally referred to herein as a "gc-safepoint." Java threads are preferably at some gc-safepoint before garbage collection can proceed.

Preferably, at each gc-safepoint within the interpreter, the mechanism conducts an explicit check to determine if garbage collection has been requested by the application program. If garbage collection has been requested, a virtual machine routine is preferably executed to take the thread to a safe state, and suspend it until garbage collection is complete. Doing a predicated check is virtually inexpensive on IA64 computers. However, it may impose considerable demands on precision architecture computers, especially if flag-data is not already in the data-cache. An alternative to this polling strategy is to interrupt all running threads using breakpoints. This strategy is generally used to interrupt a thread executing in the code cache. Following the gc-safepoint, any in-use registers that are required by the trace are spilled to the local storage of the thread.

In a preferred embodiment, the code generator generates one section of epilogue code for each exit from the trace. This epilogue code will restore the registers that the interpreter was using, set the bytecode PC to the next instruction, and, if necessary, push data onto the operand stack. The epilogue code thereby preferably restores the system to exactly the same state it would have been in, if the bytecode PC had been interpreted.

In a preferred embodiment, to ensure that the garbage collector works correctly with compiled traces, a gc-safepoint is generally available. To assist the accurate garbage collector, point maps are preferably created to locate and update all pointers.

Preferably, when garbage collection is initiated, the garbage collection (GC) thread is activated. However, it generally cannot collect data until all Java threads as well as the ARC thread are suspended at gc-safepoints. Generally, the start of each non-allocating trace needs to be a gc-safepoint. However, traces can be chained and form a loop. Generally, loops have a gc-safepoint. Further, gc-safepoints are preferably present at places where a thread can block. Generally, blocking calls are gc-safe (safe for garbage collection). In a preferred embodiment, a gc-safepoint is placed at the start of every trace.

In a preferred embodiment, the interpreter itself has gc-safepoint checks at various places. A gc-safepoint check is simply a test of a flag to see if the garbage collection has been activated. If it has, execution of the trace is preferably aborted and control is transferred back to the interpreter.

In a preferred embodiment, each trace starts with a predicated branch (for the gc-safepoint check) which should be virtually inexpensive on IA64. However, on PA systems this approach may be expensive, especially if the flag is not in the D-cache. One approach is to have the garbage collection thread activate, and place a break point at the start of every trace. Preferably, all the threads running in the code cache will hit a break-point, and end up in the break point handler, which will bring them to a gc-safe state. The gc-flag (garbage collection flag) is still set for the sake of the interpreter, and for ARC threads which will still be polling. Garbage collection starts when all threads are at gc-safepoints. Once the garbage collection is over, the break points are preferably replaced by the original instructions, and execution proceeds. This scheme generally imposes substantial overhead at garbage collection time which reduces the garbage collection overhead at run time. Since garbage collection time is generally expected to be only a small percentage of the overall running time, the proposed approach is an efficient way to handle garbage collection in adaptive run time compiler.

At step 207, the low level optimizer acts to optimize the code generated in step 206. At step 208, the branch finder operates on the optimized code.

At step 209, the instruction packer operates upon the code.

At step 210, the mechanism back patches the code and places it in a code cache. Back patching is explained in greater detail later in this specification.

In a preferred embodiment, a hot spot core is equipped with a simple code cache to store compiled snippets that it generates. Generally, snippets are brief sequences of code which are generally shorter than traces. Snippets are generally only generated for a few sequences of byte code (both in size and in type). Snippets are generally inexpensive to generate. To minimize the synchronization overhead, the snippet code cache is preferably organized into code sections associated with particular threads. By contrast, traces are longer sequences, and are generally compiled after a careful round of optimization. Traces are generally more expensive to generate, especially on a per thread basis. Therefore, all threads preferably share the code cache containing these traces.

In a preferred embodiment, the ARC (Adaptive Run time Compiler) itself will run in a background thread, periodically doing safe-point checks to ensure that it is gc-safe. Other Java threads preferably do not have to synchronize to execute code from the unsynchronized code cache, since ARC itself generally does not over-write existing traces.

In a preferred embodiment, the code cache is limited in size. Therefore, when the cache is filled up, and a new trace is to be added to the cache, some of the existing traces are removed by the garbage collector. To facilitate garbage collection of old traces, the code cache is preferably divided into various partitions that are used in a round robin fashion. Preferably, when the cache gets full, the oldest partition is removed, and the corresponding data structures are updated. Further, branches pointing to the translations in this partition from translations in the other partitions are preferably modified. The Garbage collector thread is then preferably augmented to collect these code partitions.

However, when the ARC thread invokes the garbage collector to reclaim an old partition, there could be other threads executing code within the translations that are about to be removed. To prevent such conflict, garbage collection preferably occurs only when all threads, including the ARC thread, are suspended in a state which is safe for garbage collection. Preferably, all the Java threads are out of the code cache at this point.

In a preferred embodiment, a lookup table is employed to map byte code addresses to addresses in the code cache. Preferably, all threads share the same lookup table. Updates of the lookup table should preferably occur automatically or else the updates would generally be synchronized. If only the ARC thread is allowed to make updates to this table, then the updates need not be synchronized. Further, the garbage collection (GC) thread can remove entries from this lookup table, but since all other threads are suspended when the GC thread is running, it should be safe to remove these entries. It is possible that some other thread has just read the lookup table when it got suspended, and may be assuming the presence of an entry when it resumes execution. To avoid such conflicts, the safe points at which threads get suspended are preferably carefully defined.

In a preferred embodiment, each trace may have multiple exit points. When any of these exit points is taken, control is preferably first transferred to a back patch routine. This routine generally determines whether the instruction at the next bytecode PC is a jump to native trace. If the instruction is such a jump, control may be directly transferred to the following trace. The back patch routine preferably patches the exit just taken to directly branch to the other trace so that, the next time an exit is encountered, control is directly transferred without the need for calling the back patch routine. Once an exit has been back-patched, it is possible that the target translation may be removed by the garbage collector. In this case, the exit is preferably patched again to point to the backpatch routine.

At step 211, the mechanism patches the byte code as described in the previous paragraph.

FIG. 3 depicts a flow chart of an adaptive execution scheme according to a preferred embodiment of the present invention. At step 101, the interpreter preferably acquires a method to process. At step 102, the mechanism may optionally optimize the method as a whole in the compiler 200. It is noted that in the present invention there is generally no obligation to optimize or compile an entire method at a time. The compiler 200 is discussed in detail in connection with FIG. 2. If the method as a whole is not optimized, the mechanism proceeds with adaptive execution 301 which is depicted as a block in FIG. 1. The operation of block 301 in FIG. 1 generally corresponds to the logic depicted below block 102 in FIG. 3.

In a preferred embodiment, at step 302, the mechanism acquires byte code and determines whether instructions in the byte code have been compiled in the "go native" test in block 302. If the answer is no, the mechanism executes the instruction using interpretation at step 304. If the byte code has been compiled, the compiled trace is preferably acquired from the code cache and executed at step 303. Generally, the test in 302 as to whether the code is compiled is performed at the beginning of a trace and again at an exit of a trace.

In a preferred embodiment, at step 311, the mechanism determines whether the trace is on. If the trace is on, execution continues at step 312, where the program code is appended to the trace list. If the trace is off in decision diamond 311, execution continues at step 314. After step 312 is performed, execution preferably continues at step 314.

In a preferred embodiment, at step 314, the mechanism determines whether program execution has reached the back edge of a loop or other termination criteria such as a branch. If execution has not reached such a back edge or other termination criterion, execution loops back to step 302 where more byte code is acquired. If a back edge has been reached, execution preferably continues at step 315 where the program code usage counter is incremented. It is noted that step 315 can also be reached after execution of compiled code in step 303. The program usage counter is preferably tracked by the inventive mechanism to determine which instructions are executed sufficiently frequently to warrant compilation.

In a preferred embodiment, after step 315, the mechanism determines whether a trace was on for the recently executed code. If a trace was not on, execution continues at step 319. If a trace was on, execution continues at step 316.

In a preferred embodiment, at step 319, the mechanism determines whether the PC or program code is "hot". Herein, the term "hot" here refers to code, or code traces, for which compilation would be efficient and desirable for overall system operation. Otherwise stated, such code is generally computationally profitable to compile. If the code is not hot, execution loops back to step 302. If the code is hot, the mechanism starts a trace collection at step 318, and then returns to the beginning of the loop at step 302 to get more byte code.

In a preferred embodiment, various criteria can be established to define what makes code "hot" or, otherwise stated, what would make code desirable to compile. These criteria include, but are not limited to: the amount of code involved, the percentage of execution time dedicated to the code concerned, and the total amount of execution time expended up to the point of decision on the code concerned. Some examples of "hot" code are a) code representing 20% or less of the total code, but which requires 80% or more of total execution time when using interpretation, or b) code representing 10% or less of the total code, but which requires 90% or more of total execution time when interpreting. Obviously, a range of percentages of the total code involved, and of required execution time could be employed as indicators of "hot" code without departing from the scope of the present invention. The optimum criteria for deciding when to compile selection sections of code depend on the relative computational expense of executing the pertinent code traces using interpretation, and of compilation of these code traces.

In a preferred embodiment, the decision diamond in step 319 is deciding whether the recently executed code, which has been screened for being untraced in step 317, is being executed frequently enough to justify compiling it for future execution.

In a preferred embodiment, at step 316, the mechanism turns off the trace which was found to be on in step 317. Then, at step 313, the trace is collected and added to the compile queue awaiting compilation in step 201 (FIG. 2). Execution then resumes at step 302 which acquires more byte code for execution.

In a preferred embodiment, the Adaptive Run Time Compiler (ARC) is responsible for optimizing transfers back and forth between execution by interpretation, execution of compiled code, and compiling traces found to be "hot" enough to warrant compilation. The ARC is preferably responsible for various resulting jumps in execution from the interpreter to the compiler and back to achieve optimum performance.

In a preferred embodiment, in addition to conducting optimal selection of code for compilation based on execution frequency and brevity of a code section to be compiled, the present invention offers two further basic sources of improvement in compilation efficiency. First, the inventive mechanism is preferably able to select small amounts of code for compilation at a time. In contrast to prior compilers, the code to be compiled in the present invention need not consist of a method or even a basic block. Thus, where a method contains a small segment which is "hot" according to the active criteria, the compiler of the present invention saves time in compiling with respect to prior art compilers by having less code to compile.

A second reason that compilation is faster with the present invention is that generally only straight line code is compiled. Normally, compilation time rises exponentially with the length of the segment of code to be compiled because of the increasing complexity of the branching and looping possibilities with longer sections of code. By contrast, in the present invention, the increase in compile time increases substantially linearly with increasing code segment length since only straight line code, or single path flow code, is compiled, and there is therefore no branching present to complicate matters, and non-linearly extend compilation time.

The mechanism of the present invention achieves further improvements in overall run time execution efficiency because, since it selects traces, the mechanism preferably controls various aspects of the run time environment. The mechanism is preferably able to control garbage collection and synchronization of various threads executing at run time thereby achieving further optimization.

FIG. 4 depicts allowable exit points from execution of a trace by a compiler according to a preferred embodiment of the present invention. At the top of the vertical line which represents the trace 406 is the Garbage Collection safe point 401. When switching between interpretation and compilation states, it is generally beneficial to preserve and then recover certain information before the transitions.

Preferably, in making a transition from the interpretive to the compilation state, prologue code is executed 402 which preserves data representing the interpretive state. Whenever execution exits from the compiler and return to the interpreter, prologue code is preferably executed 404 which restores data to the interpreter thereby making the intervening actions of the compiler transparent to the interpreter. Such an exit from the compiler should preferably occur at a safe point, however.

In a preferred embodiment, the state of the interpreter is stored on the stack and retrieved therefrom when necessary. Alternatively, the state of the interpreter could be stored in any portion of random access memory or other memory device.

There are various conditions which can occur during run time where an exit to the interpreter prior to concluding compilation may be beneficial. As examples, reference numeral 403 points to two such points on the trace 406. Conditions during which exiting the compiler trace 406 is preferable include, but are not limited to: checks, conditions, and exceptions. When such problems or conditions arise, control must be returned to the interpreter to handle them. Returning control to the interpreter must however be conducted at a safe point, and be accompanied by epilogue code 404 to restore the state of the interpreter, and by back patching code 405.

Generally, the Java language has a precise exception model. Unless it can be proven that an exception cannot be generated at an execution point, the partial order between all bytecode instructions that can generate exceptions is generally to be preserved. This preservation of order generally affects both optimization and code motion. The instructions that can generate exceptions act as a barrier for code motion. The JIL optimizer preferably eliminates unnecessary exception checks and thus opens the way for other optimization. For the purpose of control flow, all JIL instructions that can generate an exception preferably have a control flow edge to the exception handler. Unless exception-handling code is frequently executed, it will generally not be compiled. Upon generation of an exception, control will generally return to the interpreter to handle it.

Therefore, even when an exception, check, condition, or other situation exists requiring return of control to the interpreter, execution preferably proceeds within the trace at least up to the next identified safe point before control can be transferred to the interpreter. This is preferably because multiple threads may be executing, and the safe points are set up to ensure that conflicts between the threads do not occur when transferring control away from the compiler before compilation of the trace is complete. Preferably, the safe points serve as break points where execution within the compilation process can stop non-destructively.

In a preferred embodiment, if the process of compiling a trace 406 is concluded before compilation concludes naturally, compilation of the trace cannot be resumed in the middle of the trace, but rather must be started anew at the top 401 of the trace 406. This results from the compilation of the trace having generally been optimized for a single run from top to bottom of the entire trace and not for an entry in the middle of the trace.

In a preferred embodiment, other points along the trace 406 at which the trace can be exited in an orderly manner include the natural termination of the compiled trace, garbage collection safe points, and any location where execution encounters native code. One non-exclusive example of native code is code written in the C language which is linked to a non-native application, possibly written in Java. Where the entire trace is successfully compiled, control may be transferred back to the interpreter, or to another trace if it already exists and has been patched in.

Figure 5:
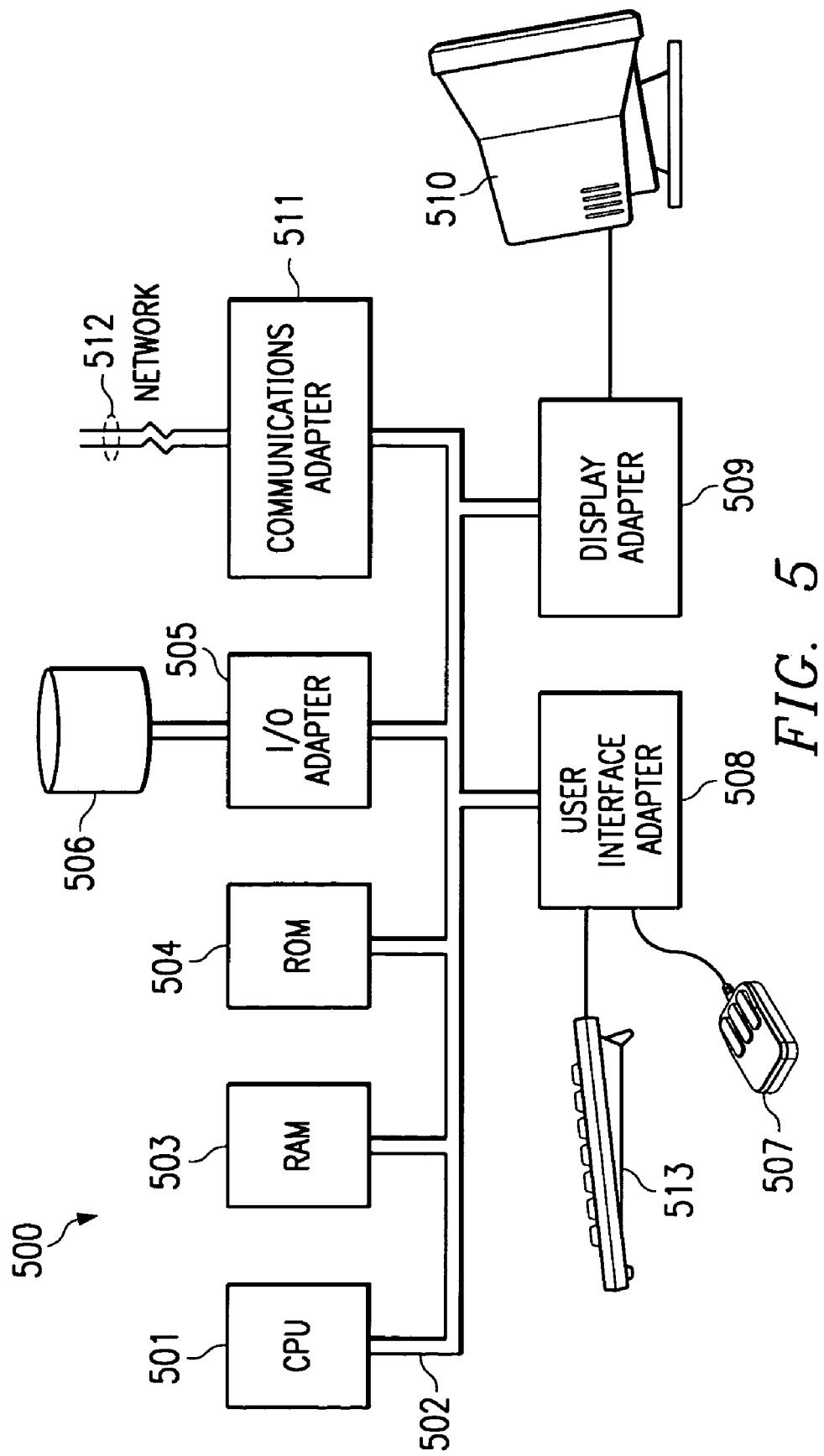
FIG. 5 depicts a computer adaptable for use with the present invention.

FIG. 5 illustrates computer system 500 adaptable for use with a preferred embodiment of the present invention. Central processing unit (CPU) 501 is coupled to system bus 502. The CPU 501 may be any general purpose CPU, such as an HP PA-8200. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

The bus 502 is also coupled to input/output (I/O) adapter 505, communications adapter card 511, user interface adapter 508, and display adapter 509. The I/O adapter 505 connects to storage devices 506, such as one or more of hard drive, CD drive, floppy disk drive, tape drive, to the computer system. Communications adapter 511 is adapted to couple the computer system 500 to a network 512, which may be one or more of local (LAN), wide-area (WAN), Ethernet or Internet network. User interface adapter 508 couples user input devices, such as keyboard 513 and pointing device 507, to the computer system 500. The display adapter 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for efficiently executing a program comprising source code, the method comprising:
    while a program is running:
    determining a selection of hot code traces from a plurality of code traces within a source code of said program based on an analysis of a frequency with which each code trace of said plurality of code traces is being executed during said running of said program and an execution pathway for said each code trace;
    upon said determining, initiating collecting of said selection of hot code traces;
    continuing said collecting of said selection of hot code traces until each hot code trace of said selection encounters termination criterion, whereby once encountering said termination criterion said each hot code trace becomes a complete hot code trace;
    adding each said complete hot code trace to a queue of complete hot code traces for subsequent compilation;
    compiling said queue of complete hot code traces, thereby enabling efficient compilation and execution of said program, wherein a balance of said source code is not yet compiled;
    wherein, during said running of said program, utilizing breakpoints instrumentation implemented with the hot code traces queue to control garbage collection and synchronize hot traces, the garbage collection control and traces synchronization comprising:
        utilizing safe points at break-points associated with said complete hot code traces within said queue to collect garbage according to a priority of said each of said complete hot code traces within said queue to be compiled, wherein said break-points provide a break within said running of said program; and
        after said garbage collection is complete, replacing each of said break-points with an original instruction and proceeding with said running of said program; and
    executing said balance of said source code via interpretation.

2. The method of claim 1 wherein said each code trace is hot when said each code trace is frequently executed.

3. The method of claim 1 wherein said each code trace is hot when:
    said each code trace constitutes less than twenty percent of said source code in an application program, wherein said application program requires a total execution time; and
    said each code trace requires more than eighty percent of the total execution time required by said application program.

4. The method of claim 1 wherein said each hot code trace of said selection comprise single path execution, thereby enabling compilation time to rise substantially linearly with a length of said each hot code trace.

5. The method of claim 1 wherein said plurality of code traces comprises a subset of a subroutine.

6. The method of claim 1 wherein said source code is in the Java language.

7. The method of claim 6 further comprising optimizing code during said compiling employing profile information supplied with said source code.

8. The method of claim 1 further comprising:
    converting said source code to Java intermediate language, thereby generating Java Intermediate language code; and
    performing optimizations on said Java intermediate language code.

9. The method of claim 1 wherein said compiling comprises:
    saving an initial interpreter state prior to modifying said state by said compiling; and
    restoring said initial interpreter state prior to returning execution control to execute a balance of said source code via interpretation.

10. The method of claim 1 further comprising:
    providing safe exit points from said executing via interpretation, thereby enabling said method to transfer execution control out of said compiling in response to an external condition in a controlled manner.

11. The method of claim 10 further comprising:
    executing back patch code when program execution jumps to another hot code trace.

12. A computer program product having a computer readable medium having computer program logic recorded thereon for efficiently executing a program comprising source code, said computer program product comprising:
    code, operative while said program is running, for determining a selection of hot code traces from a plurality of code traces within a source code of said program that is running based on an analysis of a frequency with which each code trace of said plurality of code traces is being executed during said running of said program and an execution pathway for said each code trace;
    code, upon said determining, for initiating collecting of said selection of hot code traces during said running of said program;
    code for continuing said collecting of said selection of hot code traces until each hot code trace of said selection encounters termination criterion during said running of said program, whereby once encountering said termination criterion said each hot code trace becomes a complete hot code trace;
    code for adding each said complete hot code trace to a queue of complete hot code traces for subsequent compilation during said running of said program;
    code for compiling said queue of complete hot code traces during said running of said program, thereby enabling efficient compilation and execution of said program, wherein a balance of said source code is not yet compiled;

wherein, during said running of said program, said queue compiling code utilizes breakpoints instrumentation implemented with the hot code traces queue to control garbage collection and synchronize hot traces, the garbage collection control and traces synchronization comprising:

utilizing safe points at break-points associated with said complete hot code traces within said queue to collect garbage according to a priority of said each of said complete hot code traces within said queue to be compiled, wherein said break-points provide a break within said running of said program; and after said garbage collection is complete, replacing each of said break-points with an original instruction and proceeding with said running of said program; and code for executing said balance of said source code via interpretation during said running of said program.

13. The computer program product of claim 12 wherein said each code trace is hot when said computer program logic is frequently executed.

14. The computer program product of claim 12 wherein said each code trace is hot when:

said each code trace constitutes less than twenty percent of said source code in an application program, wherein said application program requires a total execution time; and said each code trace requires more than eighty percent of the total execution time required by said application program.

15. The computer program product of claim 12 wherein said hot code traces comprise single path execution, thereby enabling compilation time to rise substantially linearly with a length of said each hot code trace.

16. A system for efficiently executing a program comprising source code in a run time environment, the system including a processor to support execution of computer-implemented means comprising:

means for determining a selection of hot code traces from a plurality of code traces within a source code of said program that is running based on an analysis of a frequency with which each code trace of said plurality of code traces is being executed during said running of said program and an execution pathway for said each code trace;

means for initiating collecting of said selection of hot code traces during said running of said program;

means for continuing said collecting of said selection of hot code traces until each hot code trace of said selection encounters termination criterion during said running of said program, whereby once encountering said termination criterion said each hot code trace becomes a complete hot code trace;

means for adding each said complete hot code trace to a queue of complete hot code traces for subsequent compilation during said running of said program;

means for compiling said queue of complete hot code traces, thereby enabling efficient compilation and execution of said program during said running of said program, wherein a balance of said source code is not yet compiled;

wherein, during said running of said program, said queue compiling means utilizes breakpoints instrumentation implemented with the hot code traces queue to control garbage collection and synchronize hot traces, the garbage collection control and traces synchronization comprising:

utilizing safe points at break-points associated with said complete hot code traces within said queue to collect garbage according to a priority of said each of said complete hot code traces within said queue to be compiled, wherein said break-points provide a break within said running of said program; and after said garbage collection is complete, replacing each of said break-points with an original instruction and proceeding with said running of said program; and means for executing said balance of said source code via interpretation during said running of said program.

* * * * *